July 23, 1968  G. E. STRAUSBAUGH  3,393,989
HINGED ORIFICE RING HOLDER FOR GLASS FEEDERS
Filed Dec. 10, 1964  2 Sheets-Sheet 1
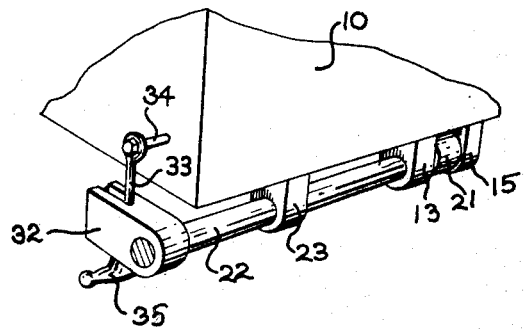
FIG. 6
FIG. 1
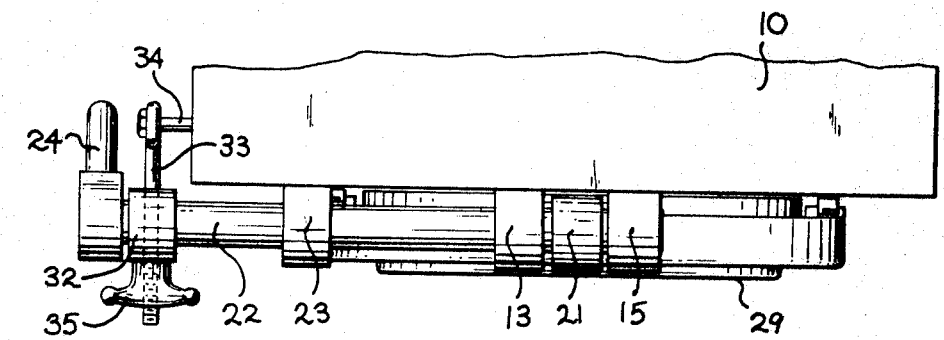
FIG. 7
INVENTOR.
GERALD E. STRAUSBAUGH
ATTORNEYS July 23, 1968   G. E. STRAUSBAUGH   3,393,989
HINGED ORIFICE RING HOLDER FOR GLASS FEEDERS
Filed Dec. 10, 1964   2 Sheets-Sheet 2

INVENTOR.
GERALD E. STRAUSBAUGH
BY
ATTORNEYS

United States Patent Office 3,393,989
Patented July 23, 1968

3,393,989
HINGED ORIFICE RING HOLDER FOR GLASS FEEDERS
Gerald E. Strausbaugh, Sylvania, Ohio, assignor to Owens-Illinois Glass Company, a corporation of Ohio
Filed Dec. 10, 1964, Ser. No. 417,279
4 Claims. (Cl. 65—325)

ABSTRACT OF THE DISCLOSURE

A hingedly mounted orifice ring holder for a glass feeder spout orifice ring in which the orifice ring and its surrounding pan are mounted in a first annular supporting ring. The first supporting ring is, in turn, mounted in a second annular support ring with the first ring being mounted on the second ring so that it has limited horizontal pivotal movement with respect thereto. The second support ring is hingedly mounted to the underneath of the feeder for swinging motion as a unit about a horizontal axis, and its free end is releasably latched. The hinge mounting is such that it also permits the second ring to pivot about a horizontal axis which is at right angles with respect to the hinge axis, thus, in effect, supporting the orifice ring and pan with a two axis gimbal arrangement.

---

This invention relates to apparatus for mounting a glass feeder orifice ring to the bottom of the feeder spout.

More particularly, this invention relates to apparatus for mounting and retaining a feeder orifice ring to the bottom of a glass feeder in a manner to assure positive continuous contact between the orifice ring and the feeder spout.

It has been the practice in the past to provide hinged orifice ring members to hold orifices to the bottom of feeders, for example as shown in U. S. patent to Barker, Jr., No. 2,075,756. The pans which hold the orifice rings are used to maintain the orifices in position beneath the feeder, and are normally supported by an arm which is hinged to the underneath of the feeder spout structure at one side and a latch mechanism of some sort holding the opposite side of the ring. This mechanism maintains the orifice ring in contact with the underneath of the feeder spout, in alignment with the flow passage through the spout bottom. One inherent problem with these types of arrangement for mounting orifice rings is that they frequently permit the lip of the orifice ring to break contact with the spout casing sealing surface, due to unequal orifice ring expansion caused by varying heat loads at different points on the ring and inside the spout.

It can readily be seen that once the ring or orifice member, 10 of Barker for example, is placed in contact with the underneath of the spout casing and locked in this position, there is no way to ensure that the upper edge of the orifice member will remain in sealing engagement, particularly in situations where warpage may occur due to ring expansion. This problem is particularly critical in situations where relatively high temperature glass is being fed from the feeder.

With the foregoing in view, it is an object of this invention to provide a hinged orifice ring holder with a quick acting latch mechanism and supporting structure which prevents loss of continuous contact between the orifice and the spout casing sealing surface.

It is a further object of this invention to provide apparatus in which the inner support ring which supports the orifice pan and orifice ring is allowed limited rotation in one plane and a second, outer support ring which surrounds and supports the inner ring is permitted limited rotation in the same plane with the axes of rotation normal to each other.

Other and further objects will become apparent from the following description taken in conjunction with the annexed sheets of drawings, wherein:

FIG. 1 is a vertical, sectional view of the orifice ring holder of the invention in its location on an orifice feeder spout;

FIG. 6 is a partial, perspective view illustrating the orifice clamp locking mechanism; and FIG. 7 is a front elevational view of the apparatus of the invention.

Figure 4:
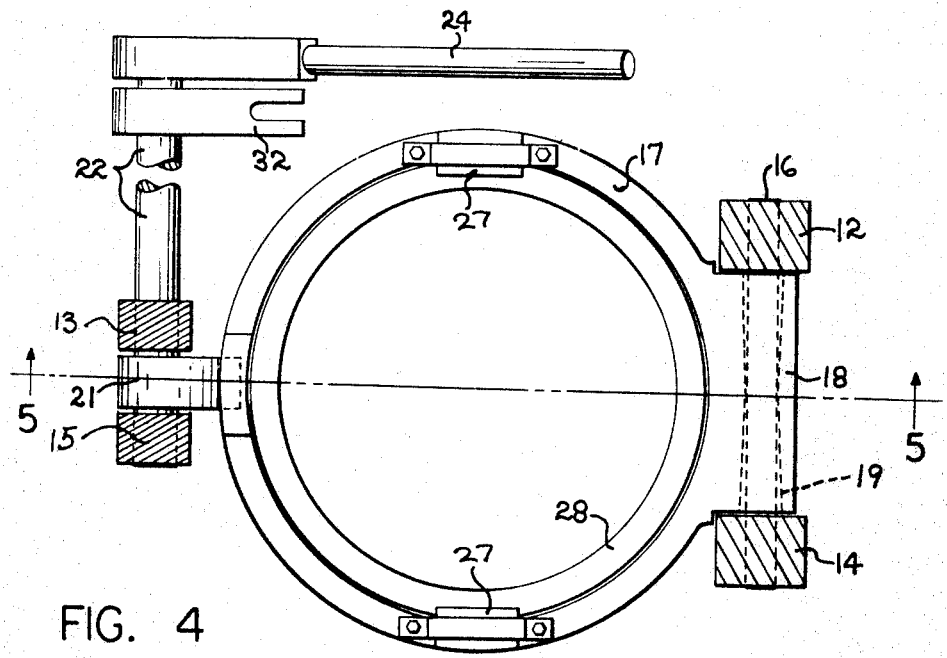
FIG. 4 is a top view of the orifice ring of FIG. 1 taken at line 4—4 with the pan and orifice removed.
Figure 5:
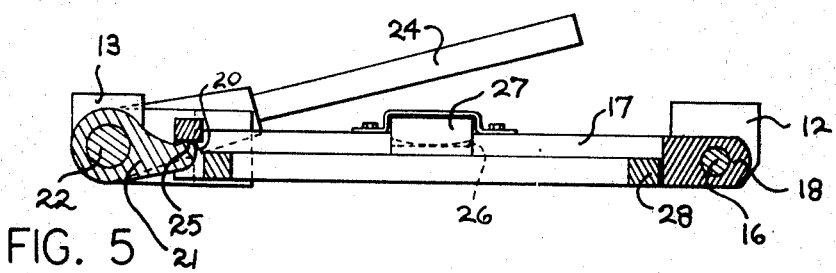
FIG. 5 is a cross-sectional view taken at line 5—5 of FIG. 4.
Figure 2:
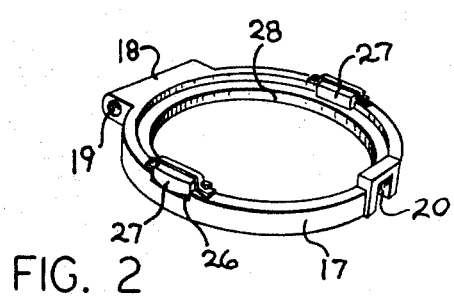
FIG. 2 is a perspective view of the orifice ring holder.
Figure 3:
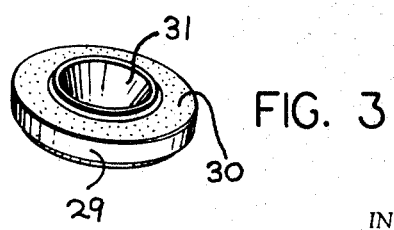
FIG. 3 is a perspective view of a typical orifice ring and enclosing pan.

As shown in FIG. 1, a conventional feeder spout structure 10 has the usual central opening 11 formed therein through which the molten glass issues. A pair of brackets 12 and 13 extending down from the undersurface of the spout on opposite sides of the orifice opening 11 along with a second pair of brackets 14 and 15 serve as the structure to which the orifice ring supporting mechanism is mounted. The two brackets 12 and 14 support a rod 16 which extends therebetween. An outer orifice supporting ring 17 is formed with a horizontal enlarged portion 18 which has an opening 19 formed therethrough. The opening 19, as best shown in FIG. 4, is tapered from enlarged end openings to the same diameter as the outer diameter of the rod 16 midway of its length. The outer ends of the openings are larger than the rod diameter. Thus it can be seen that the ring 17 may rotate to a limited extent with respect to the rod 16.

The support ring 17, opposite the portion 18, is provided with a cut-out portion 20 which is adapted to be engaged by the end of a clamping member 21. The clamping member 21 is fixed to a rod 22 which is journaled in openings formed in the two brackets 13 and 15.

The rod 22 extends in a direction parallel to the rod 16 where it passes through a third bracket 23 which is mounted to the underneath of the spout 10 near the outer edge thereof. A handle 24 is fixed to the outer end of the rod 22 and by manipulation of the handle 24, the rod 22 is rotated about its longitudinal axis to swing the clamping member 21 into or out of engagement with the ring 17 at the cut-out portion 20 thereof.

It should be pointed out that the end 25 of the clamping member 21 has a rounded surface so as to permit the outer ring 17 to freely pivot to a limited extent about a horizontal axis passing through the point of contact between the member 21 and the ring 17, and midway of the opening 19 in the portion 18 of the support ring 17. Spaced 90° around the periphery of the support ring 17 from the hinge portion 18, the ring 17 is provided with undercut notches 26. The bottoms of these notches serve as flat bearing surfaces for a pair of curved blocks 27. The blocks 27 are connected to an inner support ring 28 within which an orifice pan 29 is adapted to seat.

The pan 29, in turn, is filled with a refractory material 30. Centrally located with respect to the pan 29 and oriented with respect to the opening in the bottom of the pan is an orifice ring 31.

In view of the fact that the blocks 27, which support the ring 28 have a rounded bearing surface resting in the notches 26 of the support ring 17, the inner ring 28 is capable of rotation about an horizontal axis which extends through the center of the blocks, in parallel relationship with respect to the rod 16. Thus it can be seen that the orifice pan 29 and the orifice ring 31 carried thereby, when mounted within the inner support ring 28, is supported in a gimbal arrangement.

As can readily be seen when viewing FIGS. 4–7, locking of the orifice ring 31 in position against the undersurface of the spout 10 is accomplished by swinging the ring 17 about the rod 16 into the position shown in FIG. 1 and then manipulating the handle 24 so as to rotate the rod 22 and move the clamping member 21 into clamping relationship with respect to the support ring 17.

With the handle 24 held in this position a bifurcated block 32, fixed to the rod 22, will be in position to receive a threaded eye bolt 33 which is pivotally suspended from the side of the spout 10 by a bolt 34. The eye bolt 33 enters the bifurcated portion of the block 32 and on its lower end carries a knob 35. Rotation of the knob 35 will ensure the fixed positioning of the block 32 and serves to lock the clamping member 21 firmly against the undersurface of the ring 17. When it is necessary to change the orifice pan, it is only necessary to loosen the knob 35, swing the eye bolt 33 away from the block 32 and then rotate the handle 24. This will release the support ring 17 and permit the orifice pan and ring to swing downwardly about the rod 16. In this position a new ring and pan may be inserted in the support ring 17 in place of the old pan.

In view of the foregoing description, it will be apparent that applicant has provided an orifice supporting mechanism which is capable of holding the ceramic orifice ring in position bearing against the undersurface of a glass feeder spout. The problems attendant to the heating of the orifice supporting members which are formed of metal causing warpage, and the attendant loss of continuous contact of the orifice ring with respect to the spout is obviated.

Other and further modifications may be resorted to within the spirit and scope of the appended claims.

I claim :
1. A hingedly mounted orifice ring holder for a glass feeder spout, comprising a first annular support ring in which said orifice ring is mounted, a second annular support ring, means mounting said first ring in said second ring for limited pivotal movement with respect thereto about a horizontal axis parallel to the plane of the second ring, hinge means mounting said second ring to said feeder for swinging motion toward and away from engagement with said feeder spout, and latch means for releasably holding said second ring in engagement with said feeder.

2. The orifice ring holder as defined in claim 1, wherein said hinge means comprises a horizontal rod mounted on the feeder spout and extending through an opening formed in said second ring, said rod and opening being formed to permit limited rocking movement of the second ring relative to the rod.

3. The orifice ring holder as defined in claim 2, wherein said means mounting the first ring in the second ring comprises opposed blocks having curved bearing surfaces connected to the first ring and overlying the second ring.

4. The holder of claim 3 further comprising, means connected to said second ring and overlying said blocks for maintaining said two rings in substantial contact.

References Cited

UNITED STATES PATENTS 1,608,967 11/1926 Tucker et al. _____ 65—325 XR
2,654,185 10/1953 Honiss _____ 65—325

FOREIGN PATENTS 84,996 4/1957 Netherlands.

DONALD H. SYLVESTER, *Primary Examiner.*

FRANK W. MIGA, *Assistant Examiner.*